United States Patent [19]

Buck et al.

[11] Patent Number: 5,076,636
[45] Date of Patent: Dec. 31, 1991

[54] REAR BED VEHICLE SPOILER

[75] Inventors: Douglas H. Buck; John D. Buck, both of Brea, Calif.

[73] Assignee: D. H. Buck Company, Inc., Placentia, Calif.

[21] Appl. No.: 590,484

[22] Filed: Sep. 28, 1990

[51] Int. Cl.⁵ .............................................. B62D 37/02
[52] U.S. Cl. ................................. 296/180.1; 296/152; D12/181
[58] Field of Search ................. 296/180.1, 180.2, 57.1, 296/152, 39.2; D12/181

[56] References Cited

U.S. PATENT DOCUMENTS

| | | | |
|---|---|---|---|
| D. 309,285 | 7/1990 | Giavazzi | D12/181 |
| 4,159,843 | 7/1979 | Crossman | 296/180.1 |
| 4,707,016 | 11/1987 | McDonald | 296/39.2 |
| 4,863,213 | 9/1989 | Deaver et al. | 296/180.1 |

FOREIGN PATENT DOCUMENTS

| | | | |
|---|---|---|---|
| 2491857 | 4/1982 | France | 296/180.1 |
| 145281 | 6/1989 | Japan | 296/180.1 |

OTHER PUBLICATIONS

Lang, Bud, "Instant Spoiler", *Hot Rod Magazine*, Apr. 1967, p. 54, Class: 296, Subclass: 180.1.

Primary Examiner—Margaret A. Focarino
Assistant Examiner—Andrew C. Pike
Attorney, Agent, or Firm—Knobbe, Martens, Olson & Bear

[57] ABSTRACT

An aerodynamic spoiler mounts on and attaches to the tailgate area of a pick-up truck. A center piece has opposing flanges for mounting over and gripping the rim of the truck tailgate. Two end pieces advantageously attach independently to the rear corners of the truck adjacent the center piece. The spoiler of the present invention provides protection and enhanced aesthetic appeal to the pick-up truck and additionally imparts aerodynamic benefit thereto.

11 Claims, 2 Drawing Sheets

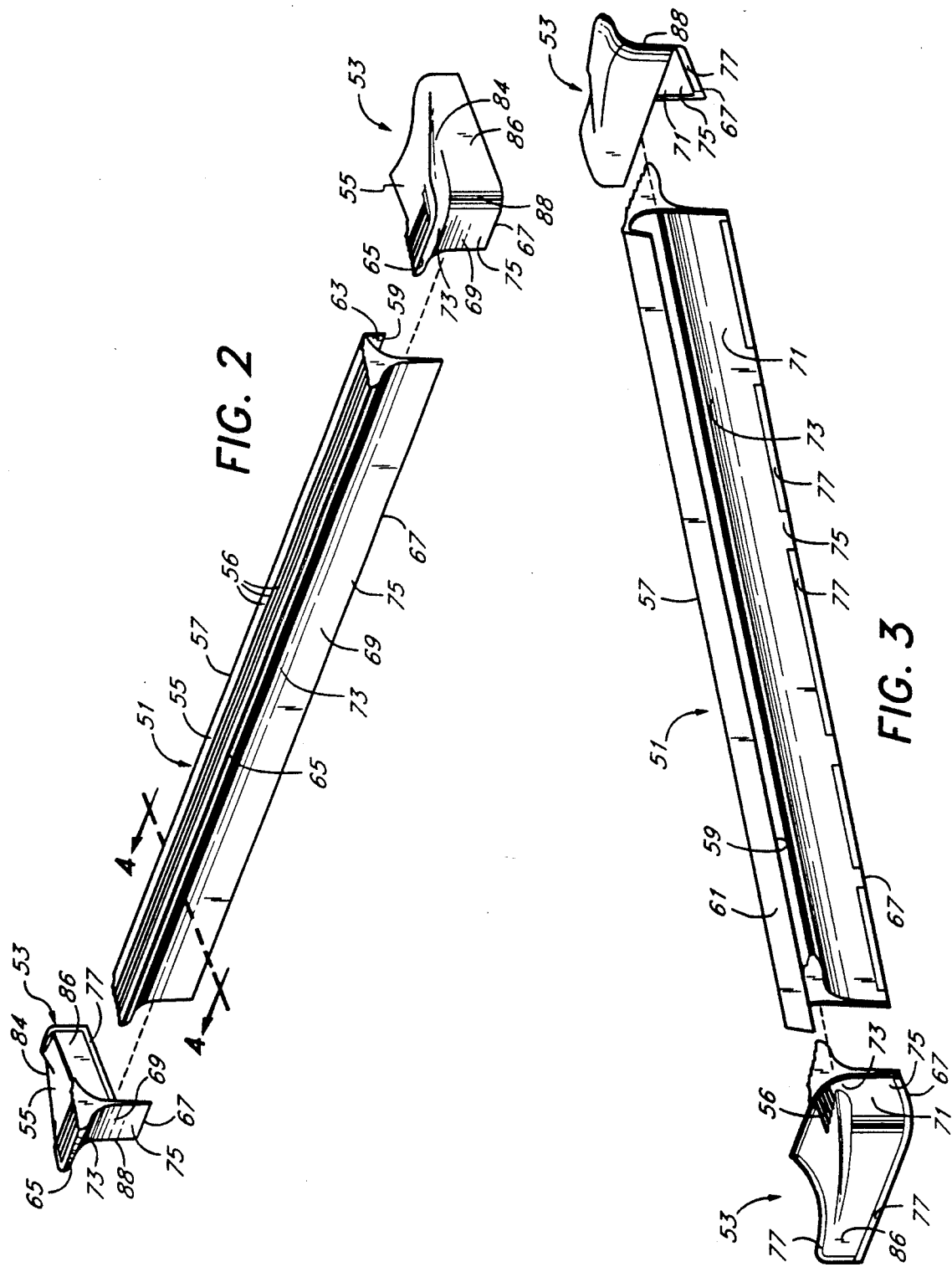

REAR BED VEHICLE SPOILER

BACKGROUND OF THE INVENTION

The present invention relates to a rear bed spoiler which is installed onto the upper rim of a vehicle tailgate and onto adjacent upper rear corners of the rear bed.

Spoilers comprise one of many types of vehicle aftermarket accessories which most commonly serve to enhance the aesthetic appearance of a vehicle such as, for example, a pick-up truck. Such spoilers, however, such as the rear bed vehicle spoiler of the present invention, often serve one or more various other useful functions. In particular, a truck bed spoiler serves to provide protection to portions of the tailgate area of a truck which are particularly prone and susceptible to scratching, denting, etc. Since, with regard to pick-up trucks, the loading and unloading of heavy and cumbersome objects (e.g. furniture, lumber, boxes, etc.) into and out of the truck bed is a relatively frequent occurrence, the tailgate rim and adjacent truck corners are commonly subject to the banging and scraping resulting from with such activities. A truck bed spoiler serves to protect the body of the truck from such damage.

Additionally, a truck bed spoiler may be given a shape so as to impart aerodynamically beneficial properties to the truck when the truck is in motion.

The present invention is directed to an improved design for a rear bed spoiler incorporating the foregoing characteristics.

SUMMARY OF THE INVENTION

The present invention relates to a spoiler which attaches to the tailgate area of a vehicle such as a pick-up truck. An elongated center piece is provided which is secured to an upper lip of a tailgate of the truck. The center piece has opposing, flexible, flange-like portions which act to advantageously grip the lip of the tailgate. Further, the center piece has an aerodynamic shape which enhances the aerodynamic characteristics of the pick-up truck.

The present invention is provided with two corner pieces which independently attach to the upper rear corners of the pick-up truck on both sides of and adjacent to the center piece. The independent attachment of the corner pieces advantageously provides protection to the truck rear corners when the tailgate is in the down position, avoids protruding ends of an otherwise single piece spoiler when the tailgate is in the down position, and permits a single part of the spoiler to be dislodged without affecting the other parts of the spoiler.

These, together with other objects and advantages which will subsequently become apparent, reside in the details of construction and operation as more fully hereinafter described and claimed.

BRIEF DESCRIPTION OF THE DRAWINGS

FIG. 2 is a perspective view of the rear truck bed spoiler illustrating the rear and side portions of the spoiler as seen from a rear view.

FIG. 3 is a perspective view of the rear truck bed spoiler looking inside the spoiler.

DETAILED DESCRIPTION OF THE PREFERRED EMBODIMENT

Figure 1:
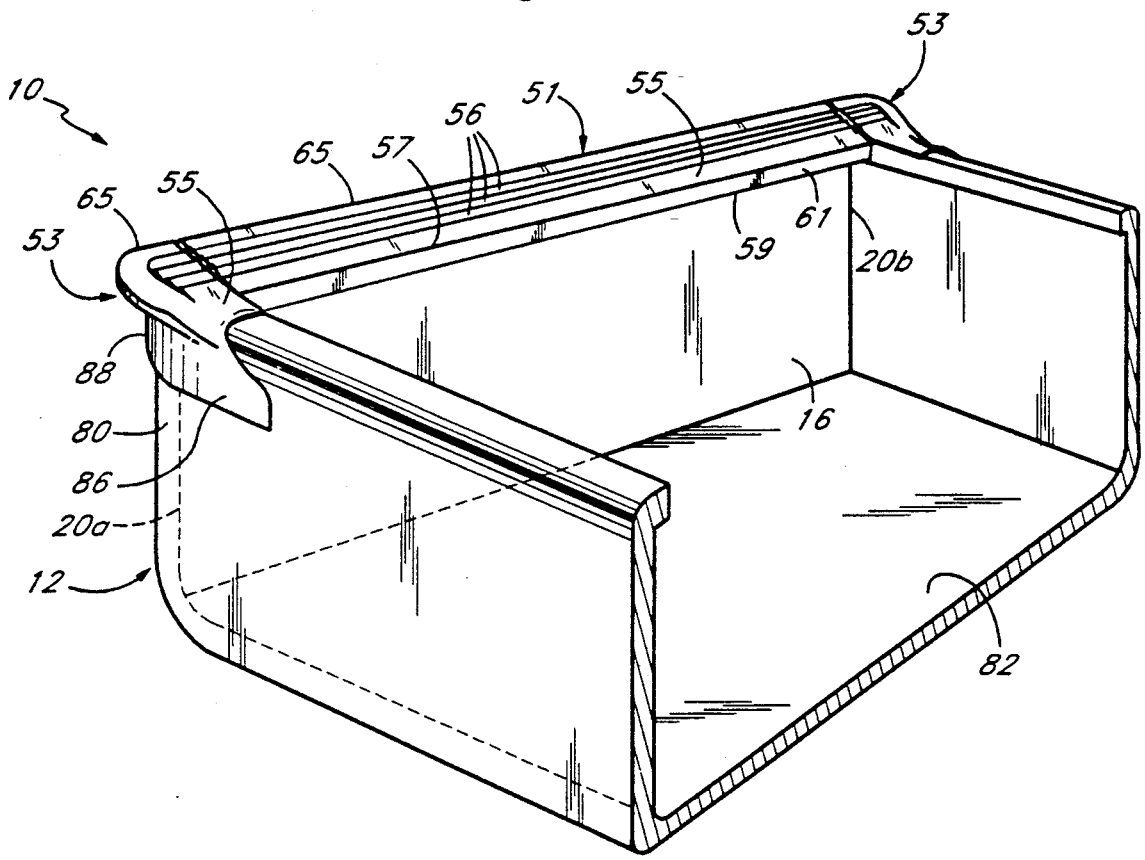
FIG. 1 is a perspective view of the rear truck bed spoiler of the present invention installed onto the tailgate portion of a pick-up truck as seen from a frontal view.

Referring to FIG. 1, a rear truck bed spoiler 10 is shown installed onto a tailgate portion 12 of a pick-up truck. Although the device disclosed in the present invention is most commonly used on pick-up trucks, the device will function equally effectively on other types of vehicles having a tailgate 16.

The aerodynamic spoiler 10 of the present invention comprises three independent pieces, namely, a main body or center piece 51 and two end or corner pieces 53. The center piece 51 is an elongated, flared, single-piece unit which attaches to the rim at the top of the tailgate 16. The center piece 51 preferably extends in length from a left edge 20a of the tailgate 16 to a right edge 20b of the tailgate 16, thereby covering the entire rim thereof.

Figure 4:
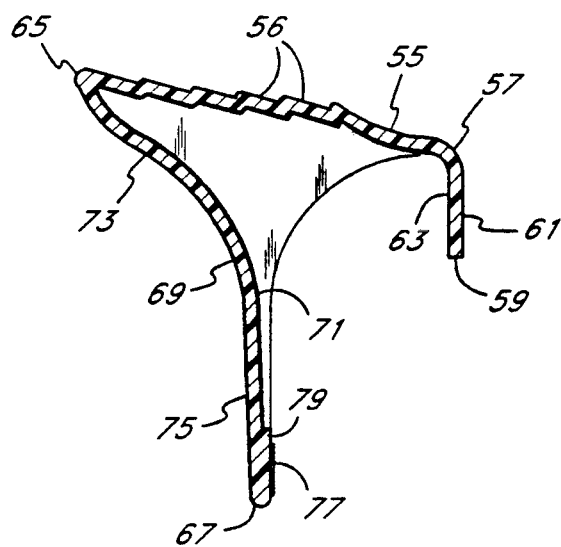
FIG. 4 is a cross sectional view of the rear truck bed spoiler of FIG. 2 taken along lines 4—4.

The spoiler 10 sits atop the tailgate 16 and is supported thereon by one or more attachment means which are described below. The spoiler 10 comprises an upper portion which is the top section of the center piece 51. In the preferred embodiment, the upper portion comprises a wind surface 55. Preferably, the wind surface 55 slopes gradually rearward and upward and abuttingly rests atop the rim of the tailgate 16. The wind surface 55 may be, in one embodiment, provided with bevels or ribs 56 protruding upward therefrom. These ribs 56 cause the air passing the wind surface 55 to be spoiled. Also, the upward sloping of the wind surface 55 causes passing air to press the rear of the truck downward, thereby increasing traction on the rear tires. A front edge 57 of the wind surface 55 is integral with a forward tongue 59 of the center piece 51 and is equivalent to an upper edge 57 of the tongue 59. The forward tongue 59 is an abbreviated lip-like portion which extends substantially downward from the front edge 57 of the wind surface 55. Further, the tongue 59 has an outer side 61 and an inner side 63 (FIG. 4).

Referring to FIG. 2, a rear edge 65 of the center piece 51 is integral with a rear flange 67 and is equivalent to an upper edge 65 of the flange 67. In the preferred embodiment, the rear flange 67 comprises an outer side 69, an inner side 71 (FIG. 3), a curved section 73 and a vertical section 75. The curved section 73 curves forward and downward from the upper edge 65 of the rear flange 67 and is integral with the vertical section 75. The vertical section 75 extends substantially straight down from the curved section 73. As seen in FIG. 4, the inner side 71 of the vertical section 75 is preferably formed with a projecting surface 79 which protrudes forward therefrom. The projecting surface 79 is flat and is substantially defined in a vertical plane. Although the center piece 51 is shown in FIG. 3 and FIG. 4 to be hollow, the space between the wind surface 55 and the curved section 73 may also be filled to conform to the rim of the tailgate 16.

Referring to FIG. 2 and FIG. 3, each of the two corner pieces 53 attaches to and protects one of the rear outside upper corners 80 of a pick-up truck bed 82. Similar to the center piece 51, the corner piece 53 has a wind surface 55 having a rear edge 65, the wind surface 55 being extended further forward than the wind surface 55 of the center piece 51. The corner piece 53 also has a rear flange 67 having an outer side 69, an inner side 71, a curved section 73, and a vertical section 75. An outer side edge 84 of the corner piece 53 is integral with a side panel 86 of the corner piece 53. The side panel 86 is also integral with a corner edge 88 of the rear flange 67.

In use, the spoiler 10 is installed onto the tailgate portion 12 of the truck bed 82. In installing the center piece 51, the center piece 51 is placed on top of the rim of the tailgate 16 and pushed downward such that the rim passes up in between the forward tongue 59 and the rear flange 67 until the rim abuts against the bottom side of the wind surface 55.

In accordance with one feature of the present invention, the forward tongue 59 and the rear flange 67 cooperate to grip the rim of the tailgate 16. To accomplish this, the center piece 51 is advantageously manufactured from a rigid, high-impact, yet slightly flexible material, for example, urethane or glass-reinforced nylon. The weight of the spoiler 10 ranges approximately from 4.5 lbs. to 5.5 lbs. Depending upon the material used, the spoiler 10 may be formed using injection molding. The flexibility and resiliency of the material allows the tongue 59 and flange 67 to flex outward during placement of the center piece 51 over the rim while maintaining, due to the rigidity of the flange 67, an inwardly acting force against the rim. Accordingly, the projecting surface 79 of the inner side 71 of the flange 67 is pressed against the outer or rear surface of the tailgate 16 while the inner side 63 of the tongue 59 presses against the inner or front surface of the tailgate 16. The projecting surface 79 provides a flat contact surface which abuts and presses against the planar rear surface of the tailgate 16. These opposing forces act to grip the rim of the tailgate 16. Thus, the spoiler 10 may be independently and securely attached to the tailgate 16 without the need for additional structure extending into and attaching to the bed 82 of the truck.

Although, the gripping force described above may provide a force substantial enough to maintain the center piece 51 on the rim of the tailgate 16, the center piece 51 may also, nevertheless, be further secured by an additional attachment means. For example, screws, bolts, or other similar attachment means may be employed to secure the center piece 51 to the tailgate 16. Preferably, however, two-sided tape 77 (FIG. 3), preferably ¾ in. in width, may be applied along those inside edges of the center piece 51 which abut against the tailgate 16. This method is deemed to be particularly advantageous because it obviates the need for puncturing the truck body (i.e. the tailgate 16), such as occurs with screws and bolts, which puncturing breaches any protective coating on the truck body and thus exposes same to rust. In addition, this method provides a means for easy and quick installation of the spoiler 10 onto the tailgate 16. For example, the spoiler 10 may be installed in this manner in as little as ten (10) minutes.

In accordance with a primary feature of the present invention, the two corner pieces 53 are installed onto the rear corners 80 of the truck bed 82 completely independently of the center piece 51. As will be seen, this provides several distinct and significant advantages. The installation of the corner pieces 53 onto the corners 80 of the truck bed 82 may be accomplished using any of the attachment means discussed above, namely, double-sided tape, screws, bolts, etc. Again, however, double-sided tape is deemed to be preferable.

Providing independently attached corner pieces 53 is advantageous for several reasons. First, such an arrangement provides protection to the corners 80 of the truck bed 82 even when the tailgate 16 is in the down position. This is of particular importance because loading and unloading of heavy and/or large objects is most likely to occur while the tailgate 16 is down. Second, if the corner pieces 53 were attached to the center piece 51, the corner pieces 53 would protrude awkwardly and dangerously from the sides of the tailgate 16 when the tailgate 16 is in the down position. Finally, should a corner piece 53 or the center piece 51 somehow become dislodged or torn off of the tailgate 16 as a result of forceful impact with a heavy object, the remaining parts of the spoiler 10 would be unaffected and would remain independently secured to the tailgate portion 12 of the truck. As a result, only the damaged parts would need to be replaced or reinstalled.

Having described the invention in connection with certain specific embodiments thereof, it is to be understood that further modifications may now suggest themselves to those skilled in the art, and it is intended to include such modifications as fall within the scope of the appended claims.

We claim:

1. In a vehicle having a tailgate, a spoiler which attaches to a tailgate portion of said vehicle, said spoiler comprising:

a center piece which attaches to said tailgate of said vehicle, said center piece effecting a gripping force on a rim of said tailgate wherein said gripping force is provided by two opposingly pressing flanges wherein said flanges comprise:

a first flange located on a front side of said tailgate which presses rearward against a front surface of said tailgate; and a second flange located on a rear side of said tailgate which presses forward against a rear surface of said tailgate;

a first corner piece which attaches to one rear corner of said tailgate portion; and a second corner piece which attaches to an opposite rear corner of said tailgate portion, said corner pieces being independent of said center piece to permit said tailgate and said center piece to be lowered without moving said corner pieces.

2. In a vehicle a tailgate, a spoiler mounted onto a tailgate portion of said vehicle, said spoiler comprising a center piece wherein said center piece further comprises:

an upper portion covering a rim of the tailgate;

a first flange located on a front side of said tailgate which presses rearward against a front surface of said tailgate; and a second flange located on a rear side of said tailgate which presses forward against a rear surface of said tailgate, said first flange and said second flange generating a gripping force which presses opposingly against said tailgate.

3. The apparatus of claim 2 wherein said upper portion ha a width greater than a width of the tailgate, and wherein said flanges, in a natural state, converge in a downward direction such that said flanges impinge against said tailgate when said spoiler is mounted on said tailgate so that said flanges press inwardly against said tailgate.

4. The apparatus of claim 2 wherein said flanges are flexible and are caused to flex away from each other during mounting of said spoiler onto said tailgate, said flanges thereafter resiliently providing said oppositely acting gripping force to said tailgate.

5. The apparatus of claim 2 wherein said upper portion is integral with said first flange and said second flange.

6. The apparatus of claim 2 wherein said second flange comprises:
   a curved section forming an acute angle with said upper portion; and
   a vertical section integral with said curved section, said vertical section pressing against said rear surface of the tailgate.

7. The apparatus of claim 6 wherein said flanges are spaced such that as said vertical section presses against said rear surface, said curved section bows outwardly away from the tailgate, thereby causing said first flange to press more tightly against said front surface of the tailgate.

8. The apparatus of claim 6 wherein said vertical section has a projecting surface which presses against said rear surface.

9. A vehicle spoiler, comprising:
   a top section which covers a rim of a tailgate of a vehicle;
   a first downwardly extending flange which covers a portion of a front surface of the tailgate; and
   a second downwardly extending flange which covers a portion of a rear surface of the tailgate, said first and second flanges cooperating to grip said tailgate with a force sufficient to permit said spoiler, when in use, to remain affixed to said tailgate.

10. The vehicle spoiler to claim 9, further comprising:
    a first corner piece which attaches to a first rear corner of a tailgate portion of said vehicle; and
    a second corner piece which attaches to a second rear corner of said tailgate portion.

11. The vehicle spoiler of claim 10, wherein said corner pieces are independent of said top section and said flanges so that said corner pieces are not moved when said tailgate is lowered.

* * * * *